US008157944B2

(12) United States Patent
Kronzer

(10) Patent No.: US 8,157,944 B2
(45) Date of Patent: Apr. 17, 2012

(54) METHODS OF MAKING STENCILED SCREENS

(75) Inventor: Frank J. Kronzer, Woodstock, GA (US)

(73) Assignee: Neenah Paper, Inc., Alpharetta, GA (US)

(*) Notice: Subject to any disclaimer, the term of this patent is extended or adjusted under 35 U.S.C. 154(b) by 827 days.

(21) Appl. No.: 11/944,837

(22) Filed: Nov. 26, 2007

(65) Prior Publication Data

US 2009/0136866 A1 May 28, 2009

(51) Int. Cl.
*B32B 37/00* (2006.01)

(52) U.S. Cl. ......................... 156/234; 156/235; 156/240

(58) Field of Classification Search ........................ None
See application file for complete search history.

(56) References Cited

U.S. PATENT DOCUMENTS

| | | | |
|---|---|---|---|
| 2,374,524 | A | 5/1941 | Bowers |
| 5,072,671 | A | 12/1991 | Schneider et al. |
| 6,393,980 | B2 | 5/2002 | Simons |
| 6,450,633 | B1 | 9/2002 | Kronzer |
| 6,539,856 | B2 | 4/2003 | Jones |
| 6,634,289 | B2 | 10/2003 | Foster et al. |
| 2004/0197695 | A1 | 10/2004 | Aono |
| 2006/0019043 | A1 | 1/2006 | Kronzer |
| 2006/0283540 | A1 | 12/2006 | Kronzer |

FOREIGN PATENT DOCUMENTS

WO WO 2006073418 A1 * 7/2006

OTHER PUBLICATIONS

PCT Search Report for Appl. No. PCT/US2008/076355.

* cited by examiner

*Primary Examiner* — James Sells
(74) *Attorney, Agent, or Firm* — Dority & Manning, P.A.

(57) ABSTRACT

Methods of making a stenciled screen for use in screen printing an image onto a substrate are generally disclosed. The method involves removing a portion of a transfer coating from a transfer sheet via heat transfer with a printable sheet defining a printable surface. The portion of the transfer coating removed from the transfer sheet corresponds to areas where an ink is present on the printable surface of the printable sheet. The transfer coating can then be transferred to a screen to form a stenciled screen having closed mesh areas corresponding to where the transfer coating is present. The stenciled screen can then be used to screen print an image onto any of a variety of fibrous substrates.

16 Claims, 7 Drawing Sheets

METHODS OF MAKING STENCILED SCREENS

BACKGROUND OF THE INVENTION

Screen printing is popular both in fine arts and in commercial printing, where it is commonly used to print images on T-shirts, hats, CDs, DVDs, ceramics, glass, polyethylene, polypropylene, paper, metals, and wood. In fact, screen printing is arguably the most versatile of all printing processes.

Traditionally, a screen is generally constructed of a porous, finely woven fabric (e.g., polymeric fibers, silk fibers, etc.). The screen can be stretched over a frame to ensure that the screen is taut. Areas of the screen are blocked off with a non-permeable material to form a stenciled screen, which is a negative of the image to be printed; that is, the open spaces are where the ink will appear on the final substrate. Ink is then pushed through the stenciled screen and onto the substrate such that the ink takes the shape of the image outlined by the stenciled screen.

Many methods of making stenciled screens are not readily available to the general public since specialized chemicals (e.g., photopolymers), specialized techniques, and special equipment (e.g., UV curing lamps) are typically needed. As such, the general public typically relies on a commercial vendor for producing a stenciled screen, and usually relies on a specialized shop for using the stenciled screen to print onto the final substrate. However, many of the general public may desire to form their own stenciled screen for their own use to form more personalized screen printed items. Furthermore, if such screens were more readily available, it would be more feasible to use them for printing items which are relatively immobile, such as walls and furniture.

As such, a need currently exists for a relatively easy method of forming a stenciled screen so that nearly any member of the general public can form their own personalized screen printed substrates.

SUMMARY OF THE INVENTION

In general, the present disclosure is directed to a method of making a stenciled screen for use in screen printing an image onto a substrate. A portion of a transfer coating is removed from a transfer sheet via heat transfer (e.g., at a temperature of less than about 150° C.) with a printable sheet defining a printable surface. The portion of the transfer coating removed from the transfer sheet corresponds to areas where a toner ink is present on the printable surface of the printable sheet.

The transfer coating, either the portion remaining on the transfer paper or the portion which has been transferred to the printable sheet, as will be explained below, can then be transferred to a screen to form a stenciled screen having closed mesh areas corresponding to where the transfer coating is present. This transfer can be conducted at a temperature of greater than about 150° C. In one embodiment, the transfer to the screen is made from the transfer paper. As such, a variety of printable sheets and a variety of toner inks can be effectively employed because the printable sheet and the toner ink are not needed for the transfer to the screen. Alternatively, in embodiments where the transfer to the screen is made from the printable sheet, a printable sheet which allows transfer of at least a portion of the toner ink along with the transfer coating is required.

Optionally, the durability of the coating transferred to the screen can be enhanced by over coating either the front side of the screen (side to which the transfer coating has been applied) or the opposite side (back side). Preferably, the material used for the increased durability is a low viscosity solution or dispersion of a polymeric material which, by virtue of the low viscosity, does not bridge the screen mesh and thus does not block ink penetration in the areas not covered by the transfer coating.

The stenciled screen can then be used to screen print an image onto any of a variety of fibrous substrates.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
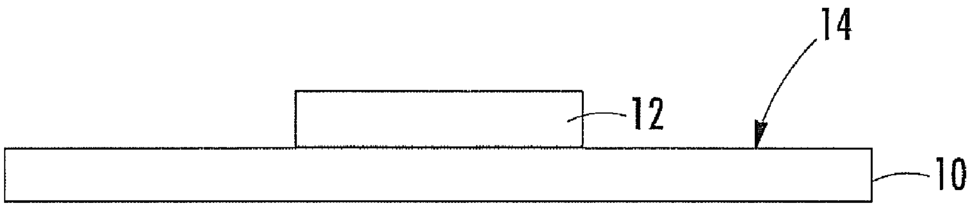
FIGS. 1-4 sequentially represent an exemplary method of preparing intermediate transfer sheets for use in forming a stenciled screen.

Repeat use of reference characters in the present specification and drawings is intended to represent the same or analogous features or elements of the present invention.

DEFINITIONS

As used herein, the term "printable" is meant to include enabling the placement of an image on a material by any means, such as by direct and offset gravure printers, silk-screening, typewriters, laser printers, laser copiers, other toner-based printers and copiers, dot-matrix printers, and ink jet printers, by way of illustration.

As used herein, the term "stenciled screen" describes a screen with blocked areas and open areas. The blocked areas of the screen define a negative of the image to be printed; that is, the open spaces are where the ink will appear on the final substrate. Ink is then pushed through the stenciled screen and onto the substrate such that the ink takes the shape of the image defined by the open areas, while no ink passes through the closed areas.

The term "toner ink" is used herein to describe an ink adapted to be fused to the printable substrate with heat.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

As is known to those skilled in the art, "Sheffield smoothness" is well established for measuring and quantifying the smoothness (or roughness) of a printing medium (e.g., a paper sheet). As used herein, the Sheffield smoothness value can be determined according to the standardized method TAPPI Test Methods, T 538 om-88, Vol. 1, 1991 (published by TAPPI Press, Atlanta, Ga.), which is hereby incorporated by reference into this specification. Commercial instruments are available for determining the Sheffield smoothness, such as Model 538 Paper Smoothness Tester from Hagerty Technologies, Inc., of Queensbury, N.Y., as well as the Sheffield Paper Gage, available from Testing Machines Inc., of Amityville, N.Y.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to methods of making a stenciled screen for use in screen printing. The methods provide a relatively simple way to allow nearly any user to customize the pattern applied to the screen to create the stenciled screen. Essentially, any design, character, shape, or other image that the user can print onto a printable sheet can be transferred to a screen to form a stenciled screen according to the methods of the present disclosure. As such, the present disclosure describes inexpensive and flexible methods of producing screen printed images on a substrate, without the need for photopolymers, UV lamps, wet application of special light sensitive emulsions to the screens, etc. Thus, the need for a commercial vendor to produce the stenciled screen is diminished.

I. Printing onto a Printable Sheet

In order to produce a stenciled image on a substrate, a toner image is first applied (e.g., printed) onto a toner printable sheet. In a particular embodiment, the image can be digitally printed onto the printable sheet via a laser printer or copier. Digital printing is a well-known method of printing high quality images onto a printable sheet. Of course, any other toner printing method(s) can be utilized to print an image onto the printable sheet, including, but not limited to, digital offset printing. Toner printing is utilized in this method because toners fuse and become adhesive at temperatures low enough (e.g., from about 50° C. to about 150° C.) to enable transfer of the coatings of this invention.

Typically, the composition of the toner ink will vary with the printing process utilized. Though not required, the image can be printed utilizing black ink only, so as to produce a black and white image. The use of a black and white image can reduce ink costs when compared to the formation of a colored image which utilizes several differently colored inks.

The image formed on the printable surface of the printable sheet can be either a "positive" or "negative" image. A "positive" image is an image that is defined by the ink applied to the printable sheet. To create a positive image, ink is applied only to those areas required to form the image. Thus, the image is positively defined in the areas of the printable sheet where the ink was applied (e.g., the black areas on the printable surface when using black ink on a white printable sheet). For example, the black letters on this sheet of paper are positively defined images because the ink is applied only to the areas required to form the letters. On the other hand, a "negative" image is an image that is defined by the area of the printable surface that is free of ink. To create a negative image, ink is applied to the entire surrounding surface area, except where required to form the image. Thus, the image is negatively defined in the areas of the printable surface that is free of ink (e.g., the white areas on the printable surface when using black ink on a white printable surface).

The image printed onto the printable sheet (either positively or negatively) will ultimately be the template for the image produced on the stenciled screen and ultimately the final substrate. However, as explained in greater detail below, depending on the particular method utilized, the image printed onto the printable sheet can either be a positive or negative of the image that is ultimately applied to the final item. Due to the vast availability of these printing processes, nearly every consumer easily can produce his or her own customized image for use as a template to make a stenciled screen.

Referring to FIG. 1, an exemplary printable sheet 10 is shown having a toner ink 12 applied to its printable surface 14. In FIG. 1, an image is positively formed in the inked areas, with the remainder of the surface are of the printable surface 14 substantively free of ink. Any suitable sheet (e.g., web, film, or a combination) having a printable surface 14 can be utilized as the printable sheet 10 in accordance with the disclosed method. For example, the printable sheet 10 can be a cellulosic nonwoven web which defines a printable surface 14. In one particular embodiment, the printable sheet can be relatively smooth, enabling sharper images to be defined. Additionally, a printable sheet with smoother surfaces can facilitate the transfer of the transfer coating from the transfer sheet to the printable sheet through more intimate contact between the surfaces. In one embodiment, the printable sheet can have a Sheffield Smoothness of less than about 300, such as less than about 150.

As discussed above, the toner ink 12 can be utilized to form a positive image or a negative image on the printable surface 14 of the printable sheet 10. After the application of the toner ink 12 to the printable surface 14, the method of producing the resulting stenciled screen is substantially the same, whether the image printed on the printable sheet is positive or negative. However, for simplicity, the following discussion is related to a positively formed image defined by toner ink 12 on the printable surface 14 of the printable sheet 10. One of ordinary skill in the art would recognize that the use of a negatively formed image on the printable sheet 10 would essentially inverse the resulting stenciled screen and screen printed substrates in the following methods.

II. Applying a Transfer Coating onto the Printed Areas of the Printable Sheet

Figure 2:
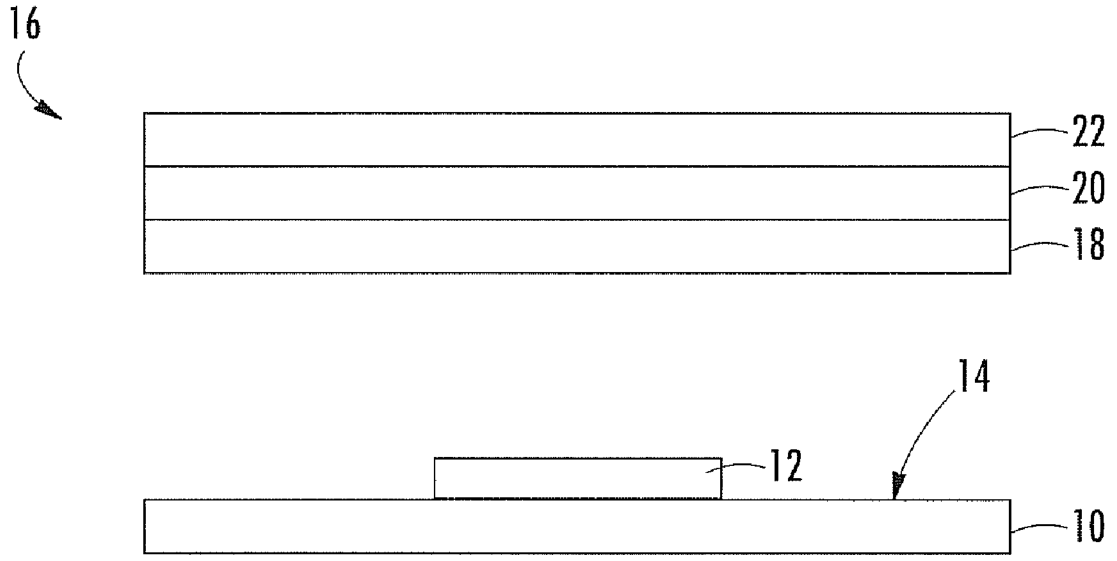

After applying a toner ink 12 onto the printable surface 14 of the printable sheet 10, the image on the printable sheet is used to remove a portion of a transfer coating from a transfer sheet via heat transfer. Specifically, a transfer coating from a transfer sheet is adhered to the printable surface 14 of the printable sheet 10 only in the areas where toner ink 12 is present. Then, the sheets can be separated (e.g., peeled apart) and the portion of the transfer coating that is adhered to the inked areas of the printable sheet is removed from the transfer sheet. For example, FIG. 2 depicts a transfer sheet 16 having a transfer coating 18 overlying a release layer 20 and a base sheet 22. Specifically, in the shown transfer sheet 16, the transfer coating 18 defines an exposed surface of the transfer sheet 16 and overlies the release layer 20. The release layer 20, in turn, overlies the base sheet 22. Although shown as two separate layers in FIGS. 2-4, the release layer 20 can be incorporated within the base sheet 22, so at they appear to be one layer having release properties.

The coating weight or thickness of the transfer coating is such that it is sufficient to cover or fill the screen. Generally, the weight of the transfer coating may be adjusted if needed; for example, fine screens would be expected to require less coating than coarser screens. For practical purposes, a coating weight of about 5 to about 50 grams per square meter is useful, such as from about 10 to about 30 grams per square meter.

Figure 3:
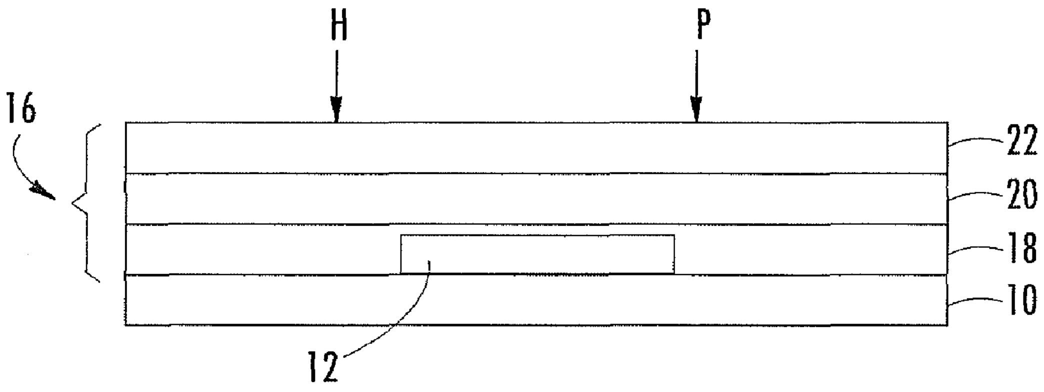
Figure 4:
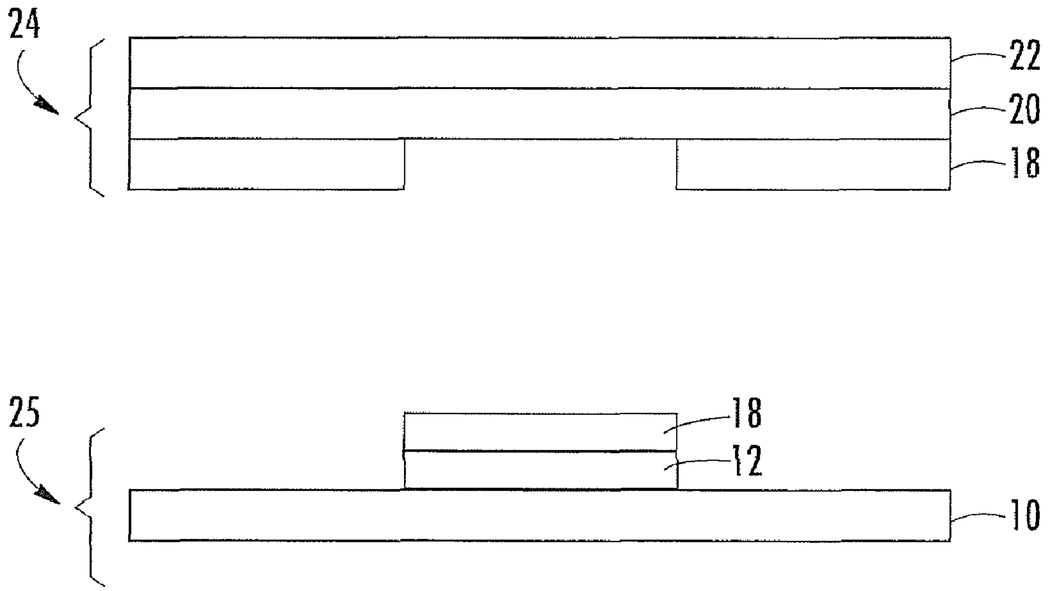

In order to remove the transfer coating 18 from the transfer sheet 16 at the areas of the printable surface 14 where toner ink 12 is present, the transfer sheet 16 is positioned adjacent to the printable sheet 10 such that the transfer coating 18 and the printable surface 14 are in direct contact, as shown in FIGS. 2-4. Upon the application of heat H and pressure P, the transfer coating 18 adheres to the area of the printable surface 14 where toner ink 12 has been applied (i.e., the inked area), but not to the area of the printable surface 14 that is free of toner ink 12. The application of heat H and pressure P laminates the printable sheet 10 and the transfer sheet 16 together as a temporary laminate. When the transfer sheet 16 is separated (e.g., peeled apart) from the printable sheet 10, an intermediate imaged transfer sheet 24 is produced having the transfer coating 18 removed from the transfer sheet 16 only at areas where the toner ink 12 contacted the transfer coating 18. Thus, the positive image applied to the printable sheet 10 becomes a negative image defined by the remaining transfer coating 18 on the intermediate imaged transfer sheet 24. Likewise, the printable surface 14 is now coated with the transfer coating 18 only at the areas where the ink 12 is present to form an intermediate transfer coated printable sheet 25. Thus, the positive image on the printable sheet 10 is now coated with a transfer coating 18 on the intermediate transfer coated printable sheet 25, while the remaining areas of the printable surface 14 are free of the transfer coating 18.

The temperature required to form the temporary laminate and adhere the transfer coating 18 on the transfer sheet 16 to the toner inked areas of the printable surface 14 of the printable sheet 10 is above the softening point of the toner ink but below the melting point of the thermoplastic particles in the transfer coating. Thus, the thermoplastic particles do not fuse to form a continuous coating in the first transfer step, but the toner ink particles fuse and become adhered to the transfer coating. This process step allows formation of crisp lines in the definition of the image and relatively easy separation of the transfer coating into imaged and non-imaged areas. For example, the transfer temperature (i.e., H) can be from about 50° C. to about 150° C., such as from about 60° C. to about 120° C. At this temperature, it is believed that the toner ink 12 softens and melts to become tacky, allowing the toner ink 12 to sufficiently adhere to the transfer coating 18. Thus, after separation, the toner inked areas of the printable sheet 10 adhere to the transfer coating 18 of the transfer sheet 16, while the areas of the printable surface 14 free of toner ink release the transfer coating 18.

Generally speaking, the transfer coating 18 is a coating that includes a film-forming binder and a powdered thermoplastic polymer, either in a single layer or multiple layers. Desirably, the transfer coating will include greater than about 10 percent by weight of the film-forming binder and less than about 95 percent by weight of the powdered thermoplastic polymer.

In general, the powdered thermoplastic polymer will soften and/or melt at a point below the transfer temperature of the second transfer step, e.g., up to about 220° C., such as in a range of from about 140° C. to about 200° C. Generally, thermoplastic polymers which do not melt below about 140° C. are preferred, since this temperature is above the softening point of the toner ink. Thus, the thermoplastic particles do not fuse to form a continuous coating in the first transfer step, but the toner ink particles fuse and become adhered to the transfer coating. This allows formation of crisp lines in the definition of the image and relatively easy separation of the transfer coating into imaged and non-imaged areas. The molecular weight generally influences the melting point properties and the viscosity of the thermoplastic polymer and the properties of the melted polymer, although the actual molecular weight of the thermoplastic polymer is not as important as the melting point properties of the thermoplastic polymer.

However, as one of ordinary skill in the art would recognize, other properties of the polymer can influence the melting point of the polymer, such as the degree of cross-linking, the degree of branched chains off the polymer backbone, the crystalline structure of the polymer when coated on the transfer sheet 16, etc.

The powdered thermoplastic polymer may be any thermoplastic polymer that meets the melting point criteria set forth herein. For example, the powdered thermoplastic polymer may be a polyamide, polyester, ethylene-vinyl acetate copolymer, polyolefin (e.g., polyethylene, polypropylene, polybutylene, etc.), and so forth. The powdered thermoplastic polymer may be provided in the form of particles that are from about 2 to about 50 micrometers in diameter. In one particular embodiment, the powdered thermoplastic polymer can be a powdered polyamide copolymer, such as Orgasol 3502 EXD available from Arkema, Inc., which is believed to be a copolymer of Nylon 6,12 in particles with an average size of 17-23 micrometers (μm) and has a melting point of about 142° C.

The film-forming binder can also have a melting point such that it softens and/or melts at the transfer temperature, although not required. Any suitable film-forming binder can be used in the transfer coating, such as acrylic latexes (polyacrylates, polyacrylics, polyacrylamides, methacrylics, resins derived from acrylic acid acrylate esters, acrylamide methacrylic acid, methacrylate esters, and methacrylamide, and the like), and copolymers and combinations of such. A particularly suitable binder is Michem Prime 4983, an ethylene acrylic acid copolymer dispersion from Michelman Chemical, Inc.

The present inventor has discovered that the specific combination of polyamide particles and binders on a suitable release coated paper provides the ability to temporarily adhere to the inked areas of the printable surface 14 without adhering to, or flowing into, the area of the printable surface 14 that is free of toner ink 12. Thus, when the transfer sheet 16 and the printable sheet 10 are separated after the application of heat and pressure, the transfer coating 18 remains on the printable surface 14 only in the areas where toner ink 12 is present, resulting in the intermediate imaged transfer sheet 24 having the transfer coating 18 removed at areas that match those inked areas of the printable sheet 10. It is expected that other combinations of polymer particles and binders would work just as well, provided that the thermoplastic particles melt in the range of about 140° C. to about 220° C., that the coating releases easily from the release coated paper, and that the ratios of ingredients are adjusted in each particular case.

In one embodiment, the transfer coating can include a cross-linking agent. Thus, a cross-linked structure may be formed from a crosslinkable film-forming binder and a crosslinking agent. Utilizing a crosslinked coating can reduce the penetration of the heated coating when it is transferred to the screen, although the adhesive nature of the crosslinked coating can still be considerable. Also, crosslinking can increase the durability of the coating.

When present, the crosslinking agent reacts with the crosslinkable film-forming binder some time after the transfer coating is applied (e.g., before the transfer is carried out, during the actual transfer process, or after the transfer has been completed) to form a 3-dimensional polymeric structure. For example, some crosslinkers, such as epoxy resins, may crosslink the coating over the period of hours or days, and would therefore be expected to crosslink before, during or after the transfer depending on the time allowed between application of the coating to the release coated paper and the transfer. More reactive crosslinkers, such as polyfunctional aziridenes, will react in several minutes to several hours, and therefore would be expected to crosslink the coating before use in the transfer process. It is contemplated that any pair of polymeric binder and crosslinking agent that reacts to form the 3-dimensional polymeric structure may be utilized, including crosslinkers which are activated by radiation or heat.

Cross-linking agents that can be used to crosslink binders having carboxyl groups include polyfunctional aziridines, epoxy resins, carbodiimide, oxazoline functional polymers, and so forth. Cross-linking agents that can be used to crosslink binders having hydroxyl groups include melamine-formaldehyde, urea formaldehyde, amine-epichlorohydrin, multi-functional isocyanates, and so forth. One particularly suitable crosslinking agent includes a water soluble epoxy resin, such as the epoxy resin sold under the name CR5L by Esprix. The crosslinking agent can be present up to about 10% by weight (dry), such as from about 0.1% to about 5%. If a crosslinker that reacts before the transfer is employed, the amount of crosslinker utilized in a particular coating may be adjusted so as to obtain a softened coating at the transfer temperature which is tacky but not fluid enough to penetrate entirely through the screen. Of course, some crosslinkers are more effective than others and so the more effective ones should be used in smaller amounts.

In another embodiment, a two-layered transfer coating can be utilized, in which only one layer is crosslinked. For example, the crosslinked layer could be applied first to the release coated paper, followed by an un-crosslinked layer. Then, upon transfer of the coatings, the un-crosslinked layer can serve the purpose of adhering the coatings to the screen while the durable crosslinked layer remains on the surface.

In addition to the film-forming binder and the crosslinking agent, a crosslinking catalyst can be present to facilitate crosslinking within the film-forming binder and between the crosslinking agent and the other polymeric material in the crosslinkable transfer coating. For example, a particularly suitable crosslinking catalyst for epoxy resins can include 2-methyl imidazole, which acts as a catalyst to crosslink the epoxy resin.

Other additives may also be present in the transfer coating. For example, in one particular embodiment, at least one surfactant is present in the transfer coating. Surfactants can help disperse the powdered thermoplastic polymer in the coating. The surfactant(s) can be present in the transfer coating up to about 20%, such as from about 2% to about 15%. In one particular embodiment, a combination of at least two surfactants is present in the transfer coating. Exemplary surfactants can include nonionic surfactants, such as a nonionic surfactant having a hydrophilic polyethylene oxide group (on average it has 9.5 ethylene oxide units) and a hydrocarbon lipophilic or hydrophobic group (e.g., 4-(1,1,3,3-tetramethylbutyl)-phenol), such as available commercially as Triton® X-100 from Rohm & Haas Co. of Philadelphia, Pa.

A plasticizer may be also included in the transfer coating. A plasticizer is an additive that generally increases the flexibility of the final product by lowering the glass transition temperature for the plastic (and thus making it softer). Likewise, viscosity modifiers can be present in the transfer coating. Other materials which may be included in the transfer coating include, but are not limited to, fillers, lubricants, slip agents and the like.

The release layer 20 is generally included in the transfer sheet 16 to facilitate the release of the transfer coating 18 to the toner inked areas of the printable surface 14. The release layer 20 can be fabricated from a wide variety of materials well known in the art of making peelable labels, masking tapes, etc. In one embodiment, the release layer 20 has essentially no tack at transfer temperatures. As used herein, the phrase “having essentially no tack at transfer temperatures” means that the release layer 20 does not stick to the overlying transfer coating 18 to an extent sufficient to adversely affect the quality of the transfer. The thickness of the release coatings is not critical. In order to function correctly, the bonding between the transfer coating 18 and the base sheet 22 should be such that about 0.01 to about 0.3 pounds per inch of force is required to remove the transfer coating 18 from the base sheet 22 after transfer to the printable sheet 10. If the force is too great, the transfer sheet 16 or the printable sheet 10 may tear when it is removed, or it may stretch and distort. If it is too small, the transfer coating 18 may undesirably detach in processing.

The release layer may have a layer thickness, which varies considerably depending upon a number of factors including, but not limited to, the base sheet 22 to be coated, and the transfer coating 18 applied to it. Typically, the release layer has a thickness of less than about 2 mil (52 microns). More desirably, the release layer has a thickness of about 0.1 mil to about 1.0 mil. Even more desirably, the release layer has a thickness of about 0.2 mil to about 0.8 mil. The thickness of the release layer may also be described in terms of a basis weight. Desirably, the release coating layer has a basis weight of less than about 45 $g/m^2$, such as from about 2 to about 30 $g/m^2$.

Optionally, the transfer sheet 16 may further include a conformable layer (not shown) between the base sheet 22 and the release layer 20 to facilitate the contact between the transfer coating 18 and the printable surface 14 of the printable sheet 10, as well as between the screen and the transfer coating.

The base sheet 22 can be any sheet material having sufficient strength for handling the coating of the additional layers, the transfer conditions, and the separation of the transfer sheet 16 and the printable sheet 10. For example, the base sheet 22 can be a film or cellulosic nonwoven web. However, the exact composition, thickness or weight of the base is not critical to the transfer process. Some examples of possible base sheets 22 include cellulosic non-woven webs and polymeric films. A number of different types of paper are suitable for the present invention including, but not limited to, common litho label paper, bond paper, and latex saturated papers. Generally, a paper backing of about 4 mils thickness is suitable for most applications. For example, the paper may be the type used in familiar office printers or copiers, such as Neenah Paper's Avon White Classic Crest, 24 lb per 1300 sq ft.

The layers applied to the base sheet 22 to form the transfer sheet 16 may be formed on a given layer by known coating techniques, such as by roll, blade, Meyer rod, and air-knife coating procedures. The resulting image transfer material then may be dried by means of, for example, steam-heated drums, air impingement, radiant heating, or some combination thereof.

III. Using the Transfer Coating to Form a Stenciled Screen

After separating the temporary laminate into the intermediate imaged transfer sheet 24 and the intermediate transfer coated printable sheet 25, two different methods can be utilized to form a stenciled screen. In one embodiment, the intermediate imaged transfer sheet 24 can be used to form a stenciled screen. In an alternative embodiment, the intermediate transfer coated printable sheet 25 can be used to form the stenciled screen; however, in this embodiment, a printable sheet which allows release of the toner ink is required.

The user can choose whether to form a positive image or a negative image on the final screen printed fibrous substrate. As one of ordinary skill in the art would recognize, forming a positive image on the final screen printed fibrous substrate requires the use of a stenciled screen having an image negatively defined by the closed mesh areas. Alternatively, a user can choose to print a negative image on the final screen printed fibrous substrate through the use of a stenciled screen having a positive image defined by the closed mesh areas of the stenciled screen. Of course, one of ordinary skill in the art would recognize that the following two methods are described with reference to a positively printed image on the printable sheet 10 in the first step. If a negative image was applied to the printable sheet 10, the following results of the methods would be the opposite.

A. Using the Intermediate Imaged Transfer Sheet

Figure 5A:
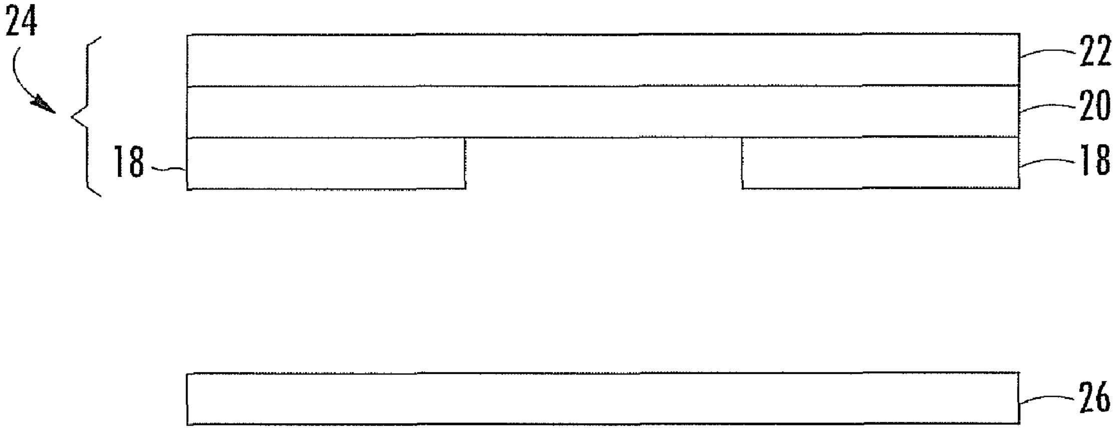
FIGS. 5A-5D sequentially represent an exemplary method of preparing a stenciled screen for use in screen printing a positive image on a substrate.
Figure 5B:
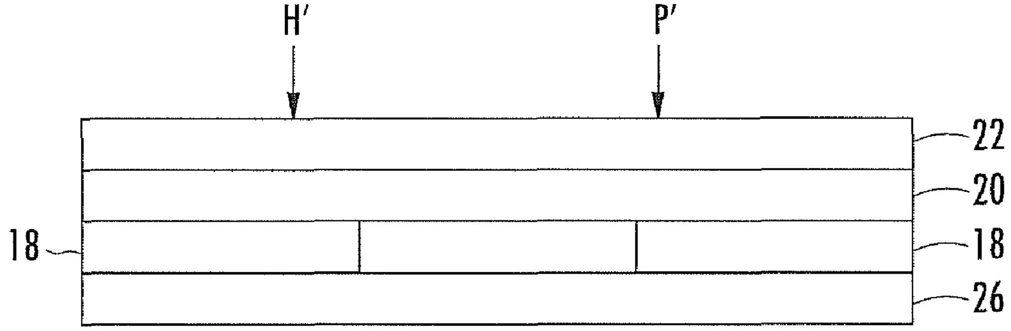
Figure 5C:
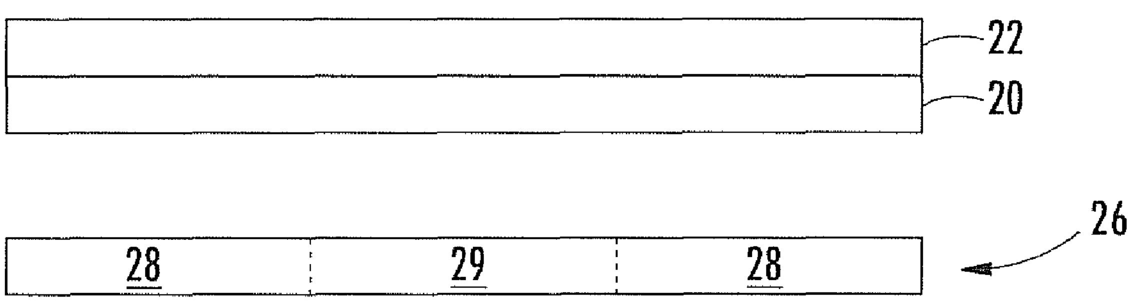
Figure 5D:
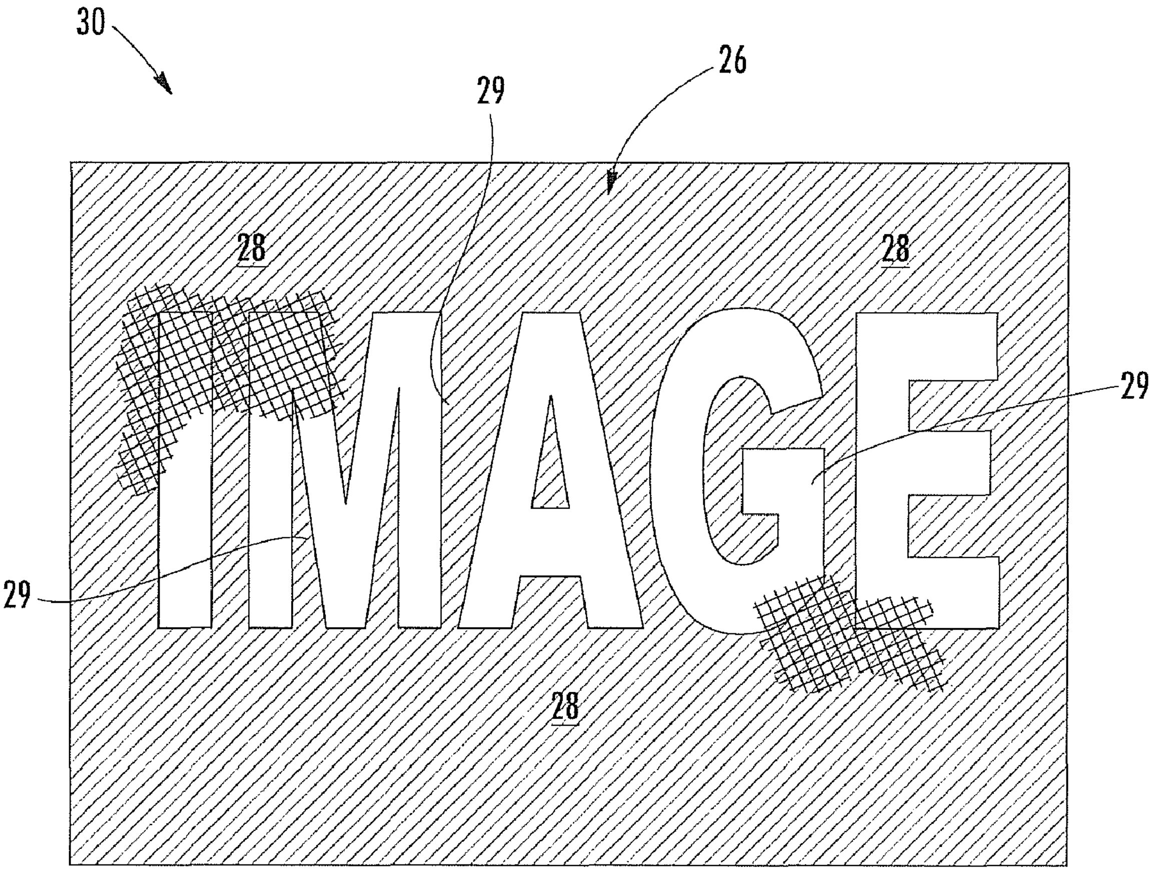
Figure 6A:
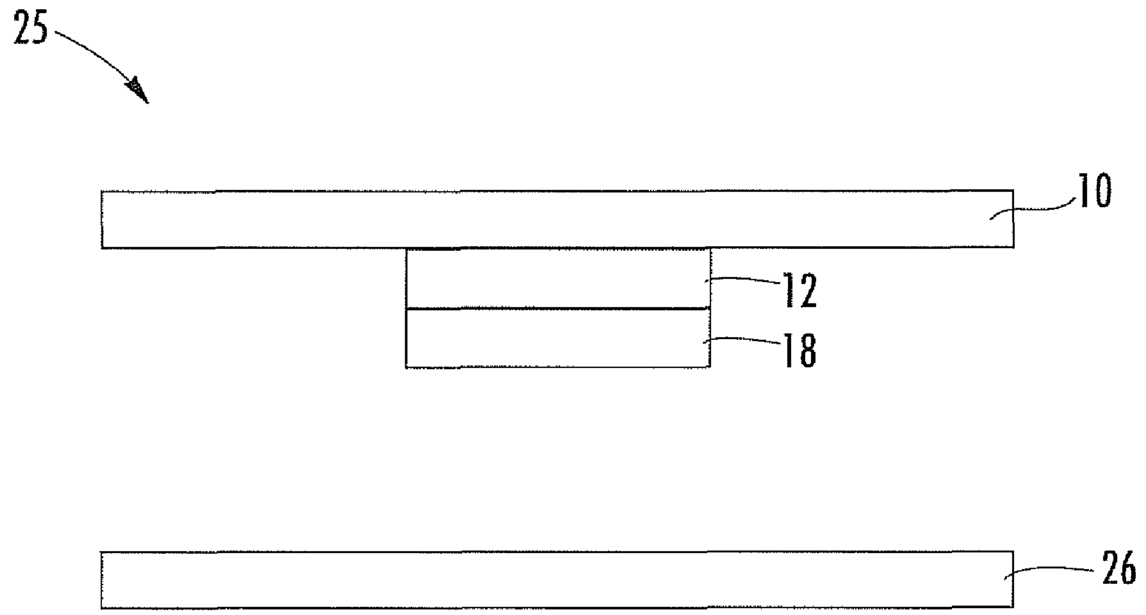
FIGS. 6A-6D sequentially represent an exemplary method of preparing a stenciled screen for use in screen printing a negative image on a substrate.
Figure 6B:
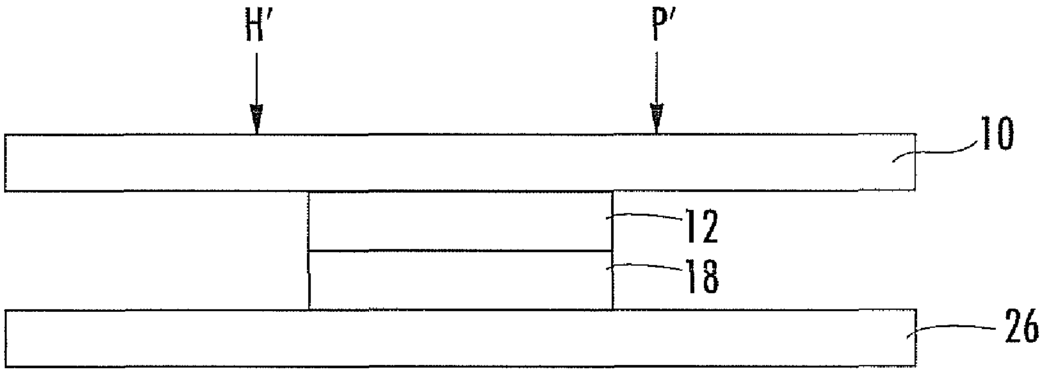
Figure 6C:
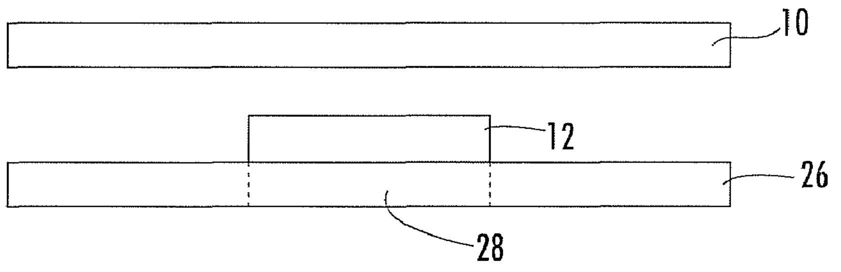
Figure 6D:
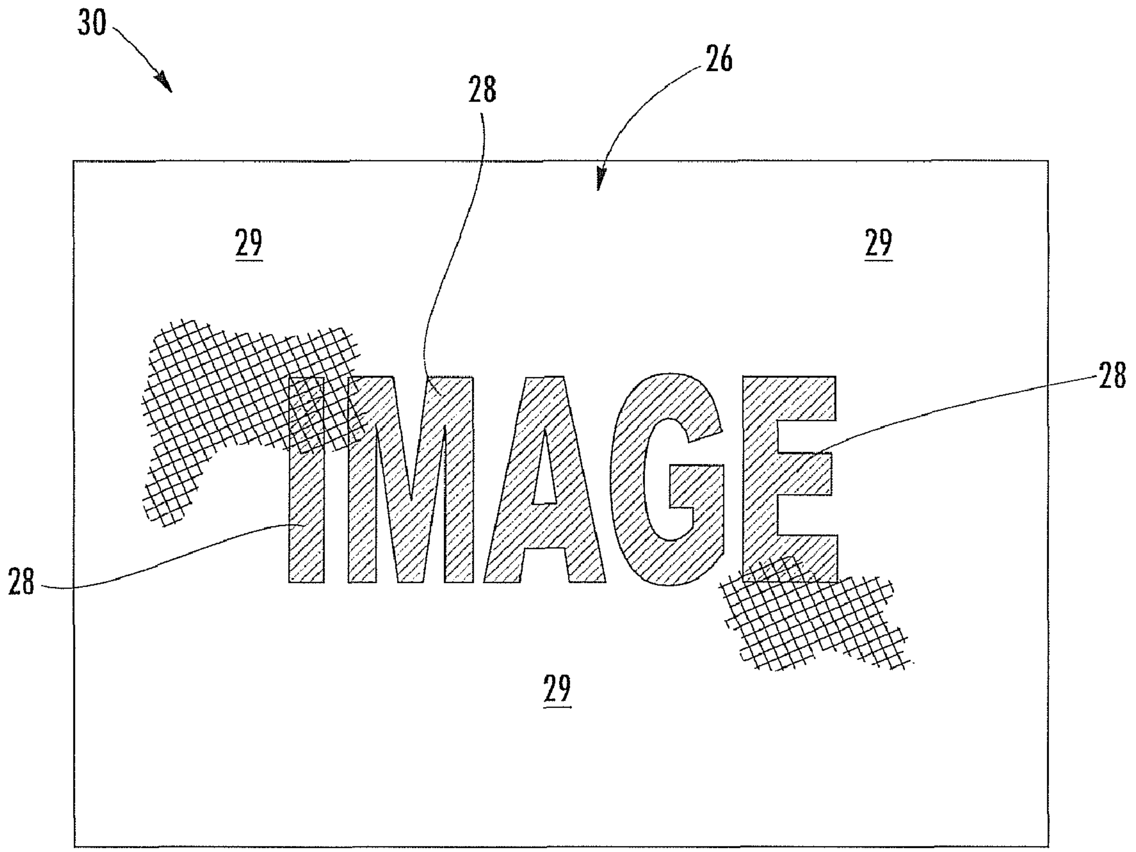

In order to form a screen printed substrate having a positively defined image which mirrors that which was printed on the printable sheet 10, the intermediate imaged transfer sheet 24 is utilized as follows. First, the intermediate imaged transfer sheet 24 is positioned above the screen 26 such that the remaining transfer coating 18 contacts the screen 26, such as shown in FIG. 5A. The intermediate imaged transfer sheet 24 is then pressed to the screen 26 and heat (H') and pressure (P') is applied to transfer the remaining transfer coating 18

This second transfer of the transfer coating 18 to the screen 26 is conducted at a temperature sufficient to melt the thermoplastic polymer, such as greater than about 150° C. In one embodiment, this second transfer can be conducted at a temperature of about 160° C. to about 200° C. At these higher temperatures, the remaining transfer coating 18 of the intermediate imaged transfer sheet 24 softens and bonds to the mesh areas of the screen 26

In the embodiment where a crosslinking agent is employed, this second transfer step can also crosslink the coating to form a solid, three dimensional crosslinked structure that is intertwined with the screen mesh. Specifically, the 3-dimensional crosslinked structure can be integrally formed about the fibers of the mesh to close those areas of the screen where the crosslinkable transfer coating is applied. The three dimensional crosslinked structure is sufficient to prevent the flow of any ink, paint or other colored material applied during the screen printing process.

At this point, if desired, an additional layer of transfer coating may be applied to the screen by repeating the steps described above. The additional layer can be applied to either side of the screen; however, if it is applied to the side opposite the side already coated, it must define a mirror image of the coating on the front side. Also, if desired, a low viscosity solution or emulsion may be applied to the screen at this point to enhance durability of the coating on the screen.

When the stenciled screen 30 is utilized in the screen printing process, ink, paint or other materials are applied through the open mesh areas 29 to form a positive image on the final substrate.

B. Using Intermediate Transfer Coated Printable Sheet

In order to form a negative image on the substrate using the intermediate transfer coated printable sheet 25, the printable sheet must be one that will release the toner and the transfer coating to the screen even after being laminated with heat and pressure. For example, the printable sheet can be the "Imaging Sheet" of Neenah Paper's Image Clip Heat Transfer system (Neenah Paper, Inc.). The printed, coated imaging sheet is positioned adjacent to the screen 26 such that the transfer coating 18 on the inked areas 12 of the printable sheet 10 contacts the screen 26, as shown in FIG. 6A-6D. Heat (H') and pressure (P') is then applied to transfer the transfer coating 18 to the screen 26. After removing the printable sheet 10, the transfer coating 18 has been applied in the screen 26 to form the closed mesh areas 28. The toner ink 12 at least partially transfers to the screen 26, but it is not critical to transfer all of the toner ink. Specifically, the screen 26 is now formed with an image positively formed in the closed mesh areas 28 of the screen 26 leaving the open mesh areas 29.

At this point, if desired, additional layers of transfer coating may be applied to the screen on either the same side as the original coating or on the reverse side. However, if an additional layer is applied to the reverse side, it must be a mirror image of the image defined by the coating on the front side. Also, if desired, the durability of the coating on the screen may be enhanced by, for example, applying a low viscosity solution or emulsion which coats the surface of the transfer coating on the screen.

During screen printing, ink, paint, or other substances, can pass through the open mesh areas 29 onto the final fibrous substrate to form a screen printed substrate having a negative image of that which was printed onto the printable sheet 10.

IV. Screen Printing the Fibrous Substrate Using the Stenciled Screen

After the stenciled screen 30 is formed, the screen is placed adjacent to the substrate. An ink, dye, paint, or other substance is applied to the substrate through the open mesh areas 29 of the stenciled screen 30, while the closed mesh areas 28 prevent the colored substance from passing through the stenciled screen 30. Thus, an image is formed on the substrate that is essentially the same as the image defined by the open mesh areas 29 in the stenciled screen 30. In the screen printing process, the ink or other material to be applied may be applied to either side of the screen. Of course, using one side will provide a front view of the image and using the opposite side will provide a reverse view (mirror) of the image. If the transfer coating is applied to only one side of the screen, it is likely that the coating would experience less wear if the coated side is placed against the substrate and the ink or other material is applied from the back side.

Any screen 26 can be utilized in this process. However, screens made of material which melts, shrinks or warps appreciably at the transfer temperature are obviously not suitable. Equally obvious is the fact that the transfer coating must adhere well enough to the screen so it doesn't begin to delaminate in use. In this regard, it may be useful to wash the screen to remove oil, grease, etc. or to pre-treat the screen with a primer. Suitable screens are readily available commercially and include a variety of mesh sizes. Likewise, screens are commercially available with many types of materials defining the mesh of the screen 26, including but not limited to polymeric fibers, silk fibers, cotton fibers, and the like. One of ordinary skill in the art would be able to tailor a specific screen for his or her intended use.

Likewise, any type of substance can be utilized to screen print the image on the final substrate, including, but not limited to, inks, dyes, paints, etc. One of ordinary skill in the art would be able to tailor a specific substance for his or her intended use.

Any substrate can be screen printed by using the stenciled screen 30 of the present disclosure. In one particular embodiment, the substrate can be a fibrous substrate, including but not limited to, woven cloth, such as used to make clothing (e.g., shirts, pants, etc.). The woven cloth can include any fibers suitable for use in making the woven cloth (e.g., cotton fibers, silk fibers, polyester fibers, nylon fibers, etc.). For example, the fibrous substrate can be a T-shirt that includes cotton fibers. Alternatively, the substrate can be a substantially flat item, like a wall.

EXAMPLES

Example 1

A printable sheet (available from Neenah Paper, Inc. as PHOTO-TRANS® Image Clip imaging Sheet) was imaged by printing a black negative graphic design onto it using an HP 4600 color laser printer. Then, the imaged paper was laminated in a heat press to a transfer sheet (available from Neenah Paper, Inc. as PHOTO-TRANS® Image Clip Transfer Sheet) in a heat press for 20 seconds at a temperature of 210° F. (about 99° C.). The laminate was separated while still hot. The imaged sheet now included the transfer coating which had transferred onto the inked areas having the toner present. The imaging sheet was then laminated to a screen designed for screen printing (available as 86 Mesh White from Ryonet Corp., Vancouver, Wash.) in a heat press for 30 seconds at 350° F. (about 177° C.). The laminate curled when the top press platen was removed, causing disruption of the coating. The experiment was repeated, but the screen was heat treated prior to the transfer step in a heat press for 60 seconds at 350° F. This time the curl was greatly reduced and the paper was removed after cooling to give a stenciled screen. However, there were numerous holes in the coated areas of the screen. The holes were eliminated by performing another transfer over the first layer in the same manner, with the imaged areas in register. In a separate experiment, the holes were eliminated by applying a second transfer layer on the side opposite the first transfer with an image which was a mirror image of the first transfer and registered with the first transfer.

Transfers done using PHOTO-TRANS® Image Clip paper using black toner images printed with either the Oki 9300 or the Lexmark C534n printers in exactly the same manner were not successful. The toner ink adhered too strongly to the PHOTO-TRANS® Image Clip paper in the second transfer step to allow reliable transfer.

Example 2

A printable sheet (available from Neenah Paper, Inc. as 24 pound Classic Crest® Supersmooth, having a Sheffield Smoothness of about 100) was imaged with an HP 4600 color laser printer with a black graphic design. Transfer papers 1, 2, and 3, prepared as described below, were successfully used to transfer the transfer coating from the transfer paper to the imaged paper in a heat press for 30 seconds at 240° F. (about 115° C.). The sheets were separated while still hot. Then, the intermediates having the imaged areas removed were laminated to a screen as in example 1, after heat treating the screen for 60 seconds at 350° F. (about 177° C.). Stenciled screens were obtained after cooling and removing the paper.

Transfer paper 1 consisted of a first layer (base sheet) of 24 pound Classic Crest® Supersmooth, a second layer (conformable layer) of polyethylene (available from Chevron Phillips Chemical LLC as Chevron 1019) a release coating and a transfer coating. The release coating was applied at a basis weight of 10 grams per square meter and consisted of 100 dry parts of Hycar 26706 (an acrylic latex from Noveon, Inc., Cleveland, Ohio), 5 dry parts of XAMA 7, (a polyfunctional aziridene crosslinker from Bayer Material Science NAFTA) and 5 dry parts of Dow Corning Surfactant 190 available from Dow Corning, Midland, Mich. The transfer coating was applied at a basis weight of 24 grams per square meter as an approximately 30% solids mixture of 100 dry parts Orgasol 3502 EXD (polyamide particles from Arkema, Philadelphia, Pa. with an average particle size of 20 microns and a melting point of 142 degrees C.), 30 dry parts of Michem Prime 4983, 3 dry parts of Tergitol 15S40 and 3 dry parts of Klucel G (hydroxpropyl cellulose from Hercules, Wilmington, Del.) and 0.5 parts of ammonia.

Transfer paper 2 was the same as transfer paper one except that 0.5 dry parts of XAMA 7 was added to the transfer coating.

Transfer paper 3 was the same as transfer paper one except that the amount of Michem Prime 4983 was increased to 40 dry parts and 40 dry parts of dispersed titanium dioxide was added.

Example 2 was repeated successfully, using transfer paper 2 and black images on the Classic Crest® 24 pound Supersmooth paper which were printed separately with an Okidata 9300 color laser printer and a Lexmark C534n printer.

Example 3

A stenciled screen was prepared by hand ironing, instead of the use of a heat press. Using an Okidata 9300 color laser printer, a black toner image was printed onto Neenah Paper Classic Crest® 24 pound Supersmooth paper. Four layers of Tee shirt material were applied on a hard table surface and overlain with a blank paper sheet, then the transfer paper sheet, face up, and then the imaged sheet, about 7 inches by 5 inch size, face down. This was ironed with a Black and Decker Digital Advantage hand iron at a setting of 2. The iron surface temperature at this setting was found to vary from about 220° F. (about 104° C.) to about 260° F. (about 127° C.). Ironing was done with both hands and high pressure, averaging about one pass in 15 seconds for a total time of three minutes. After cooling, the transfer paper intermediate was peeled from the imaged sheet. A sheet of Ryonet 86 mesh screen, heat treated for 60 seconds at 350° F., was then placed on the blank paper sheet which was again underlain with the four layers of Tee shirt material and the heat transfer paper intermediate obtained in the first ironing step was placed over the screen. Ironing was done for three minutes as before, but with the iron at a setting of 7. (At this setting, the iron surface temperature was found to vary from about 350° F. to about 420° F.) After cooling, the paper was removed to give a stenciled screen successfully.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A method of making a stenciled screen for use in screen printing an image onto a substrate, the method comprising:

removing a portion of a transfer coating from a transfer sheet via heat transfer with a printable sheet defining a printable surface, wherein the portion of the transfer coating removed from the transfer sheet corresponds to areas where an ink is present on the printable surface of the printable sheet, wherein the transfer coating comprises a film forming binder and a powdered thermoplastic polymer, and wherein the transfer is performed at a first transfer temperature of about 50° C. to about 150° C.; and transferring the transfer coating remaining on the transfer sheet to a screen at a second transfer temperature of greater than about 150° C., wherein the transfer coating transfers to the screen at the second transfer temperature to form a stenciled screen having closed mesh areas where the transfer coating is present.

2. A method as in claim 1, wherein the powdered thermoplastic polymer has a melting point of from about 140° C. to about 220° C.

3. A method as in claim 1, wherein the powdered thermoplastic polymer comprises a powdered polyamide copolymer.

4. A method as in claim 1, wherein the film-forming binder comprises reactive carboxyl groups.

5. A method as in claim 4, wherein the film-forming binder comprises an ethylene acrylic acid dispersion.

6. A method as in claim 1, wherein the transfer coating further comprises a crosslinking agent.

7. A method as in claim 6, wherein the crosslinking agent comprises an polyfunctional aziridene.

8. A method as in claim 6, wherein the transfer coating further comprises a crosslinking catalyst.

9. A method as in claim 1, wherein the transfer coating further comprises a plasticizer.

10. A method of making a stenciled screen for use in screen printing an image onto a fibrous substrate, the method comprising:

providing a printable sheet defining a printable surface;

printing a toner ink onto the printable surface of the printable sheet to form inked areas on the printable surface and areas free of ink on the printable surface;

providing a transfer sheet comprising a transfer coating overlying a release layer overlying a base sheet, wherein the transfer coating comprises a film forming binder and a powdered thermoplastic polymer;

positioning the transfer sheet adjacent to the printable sheet such that the transfer coating of the transfer sheet contacts the printable surface of the printable sheet to form a temporary laminate;

heating the temporary laminate to a temperature of about 50° C. to about 150° C.;

separating the transfer sheet from the printable sheet such that the transfer coating is transferred to the printable sheet only at the inked areas;

thereafter, positioning the transfer sheet in contact with a screen such that the remaining transfer coating contacts the screen; and transferring the remaining transfer coating from the transfer sheet to the screen at a second transfer temperature of greater than about 150° C. to form the stenciled screen having closed mesh areas where the transfer coating is present.

11. A method as in claim 10, wherein the powdered thermoplastic polymer comprises a powdered polyamide copolymer.

12. A method as in claim 10, wherein the film-forming binder comprises reactive carboxyl groups.

13. A method as in claim 10, wherein the film-forming binder comprises an acrylate latex.

14. A method as in claim 10, wherein the transfer coating further comprises a crosslinking agent.

15. A method as in claim 14, wherein the crosslinking agent comprises an epoxy resin.

16. A method as in claim 10, wherein the transfer coating further comprises a plasticizer.

* * * * *